Foster et al.

[11] 3,775,612
[45] Nov. 27, 1973

[54] PIPELINE X-RAY INSPECTION MACHINE

[75] Inventors: Robert D. Foster; William K. Holleron, both of Houston, Tex.

[73] Assignee: Monroe X-Ray Company, Monroe, La.

[22] Filed: Dec. 14, 1970

[21] Appl. No.: 97,769

[52] U.S. Cl. ............................. 250/65 R, 250/106 S
[51] Int. Cl. ............................................ G01n 23/02
[58] Field of Search ...................... 250/65 R, 106 S

[56] References Cited
UNITED STATES PATENTS

| | | | |
|---|---|---|---|
| 3,492,477 | 1/1970 | Arnesen | 250/65 R |
| 3,547,040 | 12/1970 | Baran | 250/65 R X |
| 2,742,259 | 4/1956 | Boucher | 250/65 R X |
| 3,032,661 | 5/1962 | Wolf | 250/106 S X |
| 3,087,058 | 4/1963 | Arvanetakis et al. | 250/65 R X |
| 3,147,383 | 9/1964 | Prest | 250/106 S X |

*Primary Examiner*—Archie R. Borchelt
*Attorney*—Hyer, Eickenroht, Thompson & Turner

[57] ABSTRACT

A pipeline crawler for inspecting pipe welds is driven by two motors drivingly connected to each of the driven wheels so that one motor can propel the crawler if the other motor fails. A radiographic unit is attached to the crawler frame for exposing and retracting a radioactive source in order that pipe welds can be inspected. The transverse distance between the wheels and the location on the crawler of the motors and batteries for the motors prevent the crawler from overturning as it moves through a pipeline.

15 Claims, 7 Drawing Figures

FIG.1

Robert D. Foster
William K. Holleron
INVENTORS

BY Hyer, Eickenroht,
Thompson & Turner
ATTORNEYS

Robert D. Foster
William K. Holleron
INVENTORS

BY Hyer, Eickenroht,
Thompson + Turner
ATTORNEYS

PIPELINE X-RAY INSPECTION MACHINE

This invention relates to pipeline crawlers, and in one aspect, to pipeline crawlers housing equipment for the X-ray inspection of pipeline welds.

In employing a crawling device in a pipeline, such as a pipeline X-ray inspection machine, it has been customary to attach power lines to the pipeline crawler motor and meter out the power lines as the crawler travels through the pipeline. Power for the motors propelling such a machine is thus provided by an outside source. However, in many instances, such as where great lengths of pipeline are to be traversed, the use of cables becomes clumsy and it is desirable to power the machine with batteries contained within the inspection machine, itself. Rather large batteries must be used in such service and they are generally of the storage type that must remain substantially upright at all times. Also, in X-ray inspection machines in order to insure proper alignment of the radioactive source inside the pipeline it is undesirable for the machine to deviate much from a straight path along the inside of the pipeline as it moves along the pipeline.

In prior machines of the type described, all or part of the machine has been positioned inside a pipeline so that it is substantially in the center of the pipeline. In such a case if batteries and other relatively heavy components are used, then the machine will tend to rotate while it is moving in the pipeline making it difficult to properly align the radioactive source with respect to the area to be inspected. In one machine in which batteries are employed to propel the machine, a large portion of the machine including the driving motor for the crawler is mounted in such a manner that it is subject to the undesirable rotary movement during travel within the pipeline while some portion of the machine is not subject to rotation. One of the disadvantages of this type of machine is that the ability of one portion to stay substantially upright while the other portion is rotating depends upon the efficiency and effectiveness of the joints connecting the two portions. Also, the constant movement of one section back and forth as it moves in the pipeline makes it more difficult to maintain the remainder of the machine in alignment as it moves in the pipeline.

As noted, crawlers such as described are used extensively to carry radiographic equipment through pipelines so that pipe welds can be inspected. Since the penetrating rays of the radioactive source are extremely dangerous, the source must be properly shielded when not exposed for actual weld inspection. The danger of an exposed radioactive source requires that some type of completely reliable device be provided for insuring that the source will be automatically retracted to its shielded position after exposure, or in the event of accident or loss of power.

Also, since such machines are used in pipelines of varying diameters, it is necessary that some means be provided for adjusting the vertical position of the radioactive source in the pipeline, and that the spread between the wheels be variable to accommodate the different sizes of pipe.

As with any machinery, pipeline crawlers are subject to failure during operation within a pipeline. In such a case it is necessary to send a man into the pipeline to pull the crawler out of the pipeline manually, however, if the crawler's wheels are locked by the driving gears these wheels drag and greatly add to the force necessary to pull the machine out of the pipeline. In prior machines of this type no convenient means has been provided for reducing or eliminating the drag of the wheels in the event of such an emergency.

It is an object of this invention to provide a pipeline crawler in which no portion of the crawler deviates substantially from an upright position during movement through a pipeline.

It is a further object of this invention to provide such a crawler having sufficient spread between the wheels transversely to said pipeline so that sufficient righting moments are generated to overcome any forces tending to cause deviation of the crawler from a path parallel to the longitudinal axis of the pipeline.

It is another object of this invention to provide such a crawler which is adapted for use as a portable X-ray pipe inspector that is extremely safe and in which the radioactive source will be automatically retracted from an exposed position to a shielded position within a shielded container except during normal exposure periods.

It is another object of this invention to provide such a crawler which can be easily pulled from a pipeline when its driving power is inoperative.

It is another object of this invention to provide such a crawler which is readily adapted for use in pipelines of varying diameters.

These and other objects are accomplished in accordance with the illustrated embodiment of the invention, by a unitary low profile pipeline crawler device having a center of gravity sufficiently close to the bottom of a pipeling so that the crawler stays substantially upright during movement along the pipeline. The crawler has a driving motor mounted on the lower part of the frame and a battery mounted on the lower part of the frame for powering the motor. A plurality of wheels are mounted on the crawler frame so that the lower portion of the frame is supported by the wheels near the bottom of the pipeline. The spread between the wheels transversely to said pipeline and the location of the motor and battery are such that forces tending to overturn the crawler as it moves down the pipeline do not cause it to deviate from a path substantially parallel to the longitudinal axis of the pipeline.

In accordance with a further novel aspect of this invention, the pipeline crawler is a portable X-ray pipe inspector that includes a shielded container mounted on the frame of the inspector for storing a radioactive source in a protected position. In the portable X-ray pipe inspector means are provided for automatically retracting the radioactive source from an exposed position in a collimator wherein the pipe walls are penetrated by the rays to a protected position to insure that the source will not remain exposed except during the normal exposure period.

In accordance with a further novel aspect of this invention, each of the motors of the inspector is drivingly connected to a wheel so that a wheel of the inspector is driven at all times, even in the event of failure of one of said motors, by at least one of said motors to move the inspector along the pipe wall.

In accordance with a further novel aspect of this invention, means are provided for displacing the power driven wheels from contact with an inside pipe wall in order to provide mobility to the pipe inspector after the wheels have been rendered immobile by failure of the entire X-ray inspector power system.

The preferred embodiment of the invention will now be described in connection with the drawings, in which.

Figure 1:
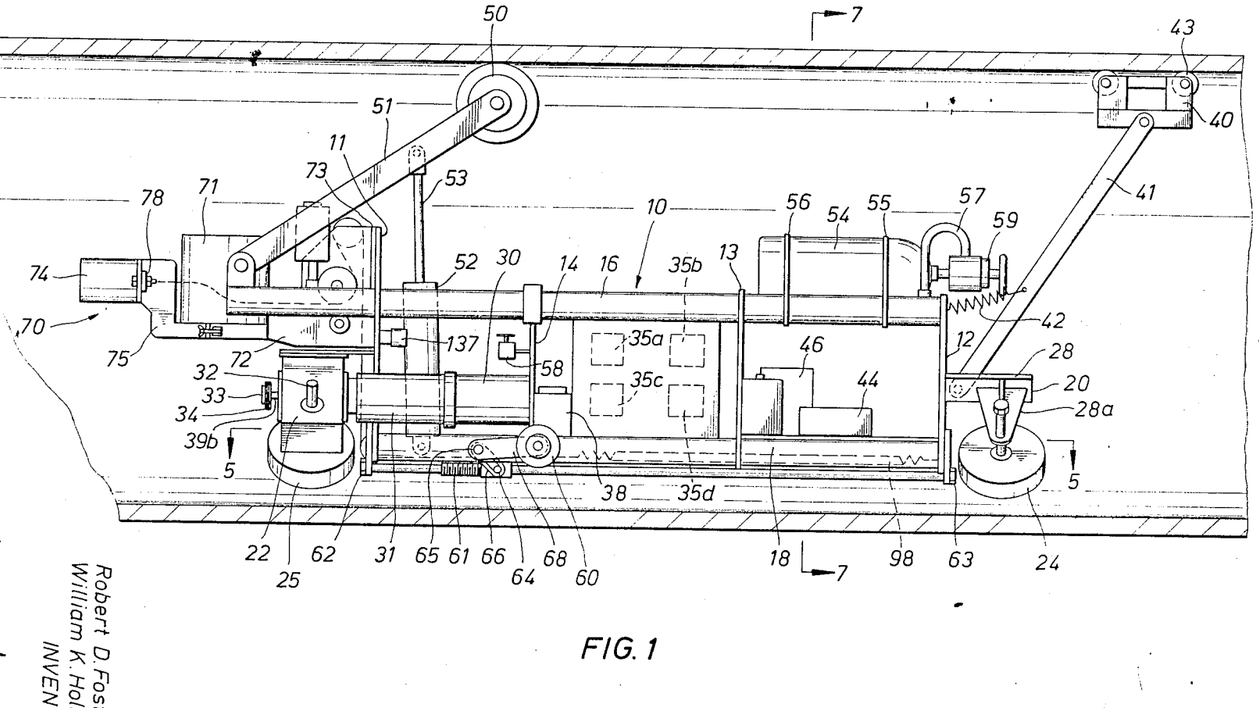
FIG. 1 is a view in elevation of the portable X-ray pipe inspector.

Referring to FIG. 1, a frame 10 for the pipeline crawler device includes a front bulkhead 11, a rear bulkhead 12 and supporting bulkheads 13 and 14. Extremely strong tubing connect the bulkheads. In the preferred embodiment of FIGS. 1, 6, and 7 the tubing includes two supporting tubes 15 and 16 attached to the upper portions of bulkheads 11, 12, 13, and 14 and two supporting tubes 17 and 18 attached to the lower portions of the bulkheads.

Figure 6:
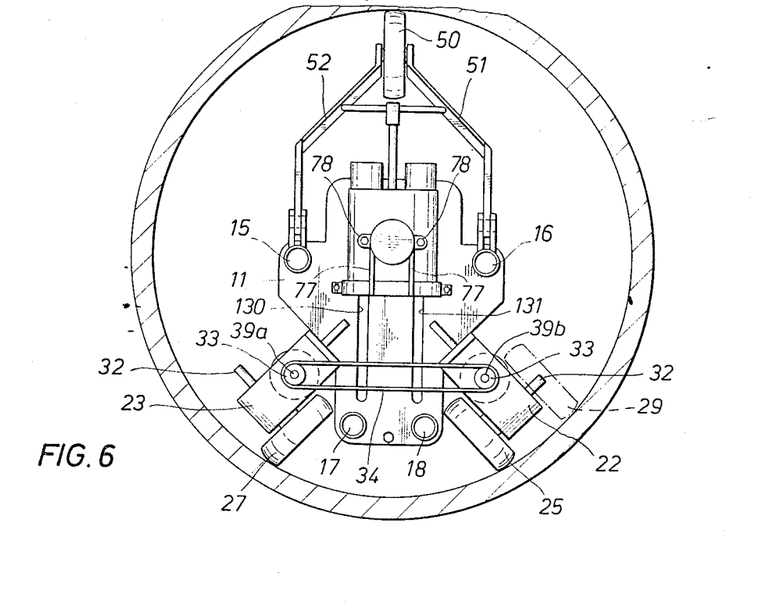
FIG. 6 is a front elevational view of the pipe inspector of FIG. 1.
Figure 7:
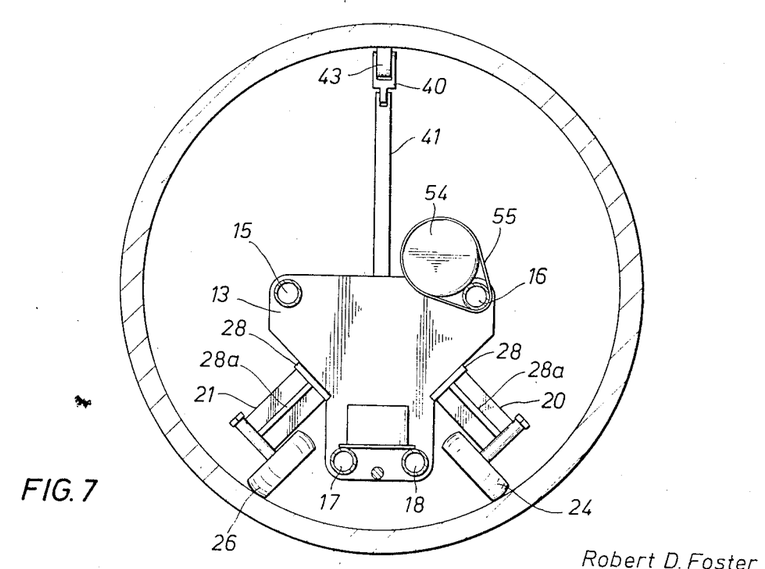
FIG. 7 is a sectional view of the pipe inspector taken along line 7—7 of FIG. 1.

Mounted onto frame 10 in the lower portions of front and rear bulkheads 11 and 12 are a plurality of wheel supports 20, 21, 22, and 23. Wheels 24, 25, 26, and 27 are mounted on the wheel supports for supporting the crawler near the bottom of the pipeline. Wheel supports 20, 21, 22, and 23 include studs 28 extending from the front and rear bulkheads 11 and 12 of the frame. Flanges 28a extend radially from studs 28 that are attached to the bulkheads. The wheel supports further include shafts 32 extending on both sides of flanges 28 providing means for mounting the wheels for rotation on either side of flanges 28. The alternate wheel positions are designed to support frame 10 of the crawler as near to the bottom of the pipeline as possible notwithstanding variations in the size of the pipeline. Thus for pipe diameters which are quite small with respect to the crawler, the wheels are disposed in the position illustrated by wheels 25 and 27 in order to provide the frame 10 with clearance from the bottom of the pipe. Whenever the pipe to be transversed has sufficient diameter to provide clearance, the wheels positions such as that of wheel 29 in FIG. 6 are used.

Two driving motors 30 are mounted on intermediate bulkhead 14. Each of the motors are drivingly connected to a wheel so that such wheel is driven at all times, even in the event of failure of one of the motors, by at least one of the motors to move the crawler along the pipeline. Each motor 30 is connected to a wheel 25 or 27 through a planetary driving gear 31 that powers a worm gear (not shown) on motor shafts 39a and 39b that rotate a spur gear (not shown) on a wheel shaft 32. In the preferred embodiment the motors used are ½ horsepower dc high rpm motors rotating at approximately 500–600 rpm. Planetary gear 31 produces a gear ratio of about 3 ½:1 in providing sufficient torque to move the cralwer. Batteries 38 for powering the motor are mounted in the lower part of the frame between intermediate bulkheads 13 and 14. Batteries 38 also provide power for the actuating of solenoids 35a, 35b, 35c, and 35d which is used to operate various systems as as later described.

The spread transversely between wheels 25 and 27 and wheels 24 and 26 and the location of the mounting of the motors and batteries are such that forces tending to overturn the crawler do not cause it to deviate from a path substantially parallel to the longitudinal axis of a pipeline. This maintenance of a substantially upright position is accomplished by disposing the frame and the motor and batteries mounted on the frame sufficiently close to the bottom of the pipeline that the crawler has a center of gravity vertically close to the wheels. In this manner the forces caused by the wheels traveling in ruts and by the centrifugal force exerted when the crawler travels through a pipe bend, acting at the center of gravity of the crawler, are insufficient to overcome the moments of resistance of the transversely spread wheels 24 and 26 and 29 and 27 thereby preventing deviation of the crawler.

The spur gears (not shown) are a part of worm gear shafts 39a and 39b of planetary gears 31. Motor shafts 39a and 39b are linked by a chain 34 that synchronizes the speed of wheels 25 and 27 as driven by motors 30. The linking of wheels 25 and 27 by chain 34 connects each motor 30 with the wheel normally driven by the other motor so that one motor can drive both wheels in case of failure of the other motor. Therefore the crawler can continue to travel through the pipeline and complete its purpose, such as weld inspection, even though one motor or the power system for one motor has failed.

In the embodiment shown, the application of battery power to motors 30 to cause movement and stopping of the crawler is preferably controlled by an encoder-transmitter (not shown) operated outside the pipeline. One form of such an encoder-transmitter is described in Patent Application Ser. No. 696 filed on Jan. 5, 1970, and assigned to the same assignor as this patent application. The encoder-transmitter is designed to generate a plurality of electrical control signals at varying electrical frequencies. The crawler device illustrated in FIG. 1 includes a receiving transducer unit 40 connected on an arm 41 for receipt of the electrical control signals. Receiving unit 40 is attached to a pivotal arm 41 and is kept in contact with the inner surface of the pipeline by spring 42. Wheels 43 maintain receiver 40 in rolling contact with the inside pipe wall. The receiving transducer 40 converts the vibrator signals into electrical signals of the same frequency as the signal originally generated by the encoder-transmitter (not shown). Encoder circuits 44 receive the designated electrical control frequencies from receiver 40 and provide output signals that are conducted to solenoids such as 35a. A battery 46 provides power solely for the encoder-receiver unit.

In operation the operator outside the pipeline generates the predesignated "START" frequency control signal that is converted in encoder circuits 44 into a signal directing a relay (not shown) to start the crawler motor thereby moving the crawler down the pipeline. The operator proceeds down the pipeline to a weld to be inspected and places an encoder-transmitter (not shown) emitting a "STOP" signal a distance from the weld exactly equal to the distance between receiving transducer 40 and collimator 74 of radiographic unit 70. When the receiving unit 40 is disposed directly below the encoder-transmitter a stop signal is picked up by receiving unit 40 and this signal is conducted to circuits 44 which provides an electrical signal to the motor relay to cut off power to the motor. Thus, the crawler is stopped with the collimator of the radiographic unit aligned with the weld to be inspected.

An adjustable wheel 50 is pivotally mounted on the frame 10 by arms 51 and 52 that are pivotally connected to tubular member 15 and 16 of the frame. Means are provided for distending wheel 50 into contact with the pipe wall with sufficient force so that motor-driven wheels 25 and 27 are caused to maintain a traction greater than that produced by the weight alone of the crawler against the pipeline wall when driving motors 30 are powering wheels 25 and 27 to move thereby moving the crawler along the wall. The means for distending adjustable wheel 50 includes an air cylinder 52 pivotally connected to frame 10 and having a piston rod 53 connected to arms 51 and 52. Pressurized carbon dioxide or another gas under pressure is provided in a tank 54 mounted on tubing 16 by bands 55 and 56. The compressed gas is conveyed through gas line 57, sealed tubing 16 and into air cylinder 52 through a pressure regulator 58. Adjustable wheel 50 is pivoted into contact with the inside pipe wall when the crawler is placed into the pipeline. Compressed gas is released from tank 54 at that time by manipulating control and relief valve 59 to allow compressed gas to extend piston rod 53. The setting in pressure regulator 58 determines the force of contact of wheel 50 with the pipe wall. The air cylinder may be activated by the encoder-transmitter receiver electrical signal network previously described so that an operator outside the pipeline can control the distending of wheel 50 into contact with the inside pipe wall.

Figure 5:
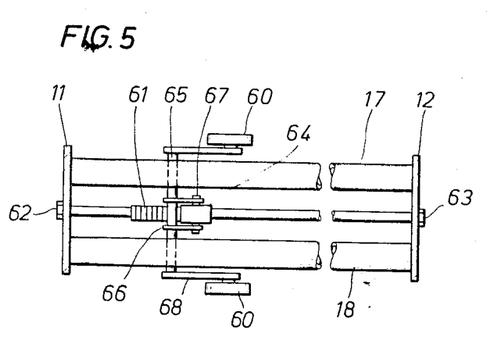
FIG. 5 is a sectional view of the crawler taken along line 5—5 of FIG. 1.

If both motors should fail during operation of the crawler in a pipeline it is difficult to remove the crawler due to the inability of wheel shaft 32 of wheels 25 and 27 to freely rotate because the spur gears on wheel shaft 32 are unable to rotate against the worm gear on planetary driving gear 31. Therefore in case both motors fail, means are provided for displacing motor-driven wheels 25 and 27 from contact with the inside pipe wall while providing a rolling support for the crawler to permit mobility thereof, Referring to FIGS. 1 and 5, the displacing means includes a longitudinally threaded member 61 rotatably mounted on the frame so that it may be rotated by any suitable wrench fitting, such as either bolt 62 or 63 extending respectively through front bulkhead 11 and through rear bulkhead 12. A threaded sleeve 63 encircles threaded member 61 so that sleeve 64 is longitudinally displaced by rotation of threaded member 61. A shaft 65 is rotatably mounted on the frame through tubing 17 and 18. A slotted crank 66 is slidably connected at one end to sleeve 64 and rigidly connected at the other end to shaft 65. The slidably connection between crank 66 and sleeve 64 is accomplished by fitting stud 67 on the sleeve into the slot in crank 64. A link arm 68 having wheels 60 mounted on one end is rigidly connected to shaft 65 so that wheels 60 are pivoted about shaft 65 into and out of contact with the inside pipe wall by longitudinal displacement of sleeve 64. A plurality of rolling means, such as wheels 60, are connected to the displacing means to partially support the weight of the crawler when motor-driven wheels 25 and 27 are displaced. When a failure of both motors occurs adjustable wheel 50 must be released from pressurized traction with the inside pipe wall caused by air cylinder 52. This may be accomplished by an operator utilizing the encoder-transmitter to obtain a signal from encoder circuit 44 that will operate a solenoid such as 35a causing pressure regulator 58 to release the pressure against piston rod 53. This allows wheel 50 to yield when wheels 25 and 27 are displaced from contact with the inside pipe wall. If for some reason pressure regulator 58 cannot be operated by the encoder circuitry the regulator will automatically vent cylinder 52 in response to the additional pressure in the cylinder when wheels 25 and 27 are displaced.

Figures 2, 3:
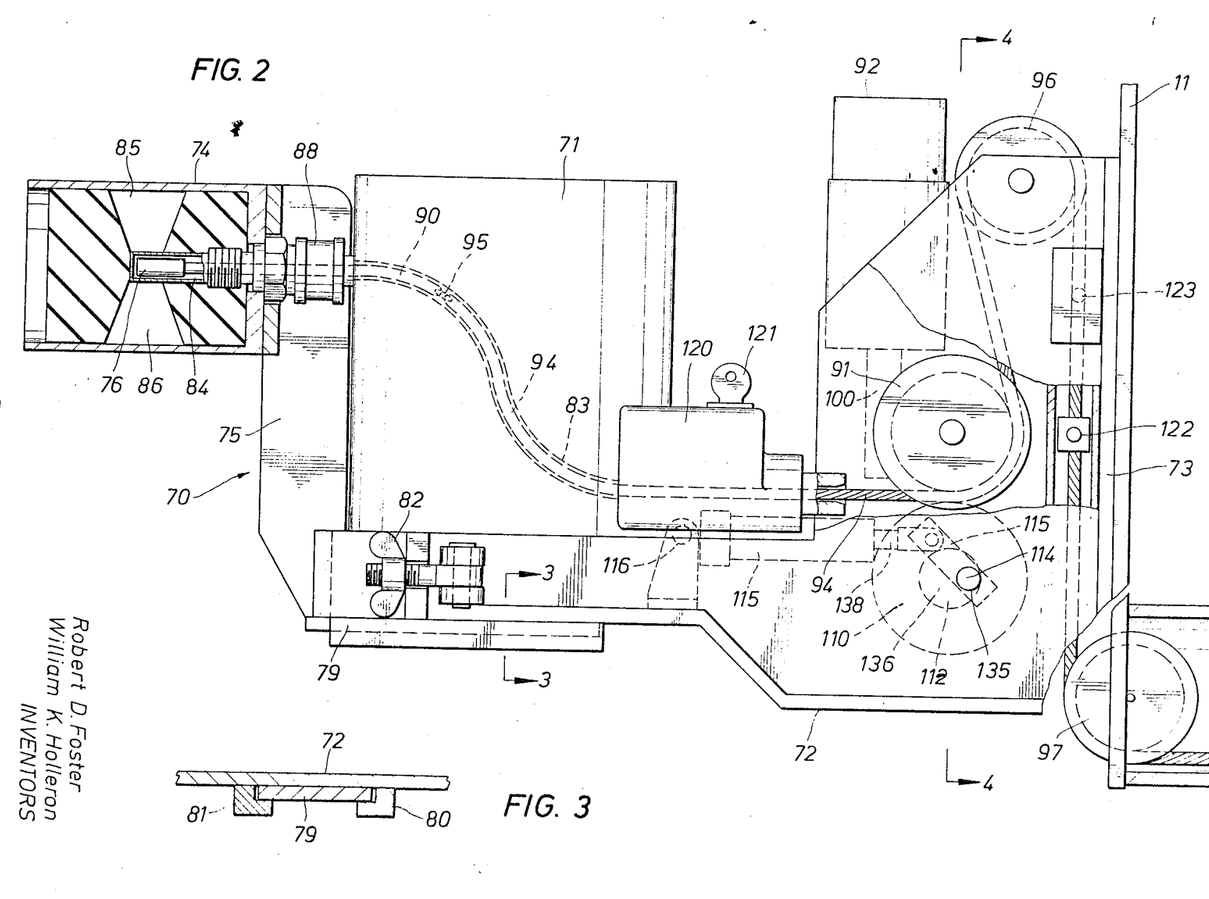
FIG. 2 is an elevational section view of the radiographic unit of the pipe inspector of FIG. 1.
FIG. 3 is a sectional view of the mechanism mounting the collimator onto the shielded container for the radioactive source.
Figure 4:
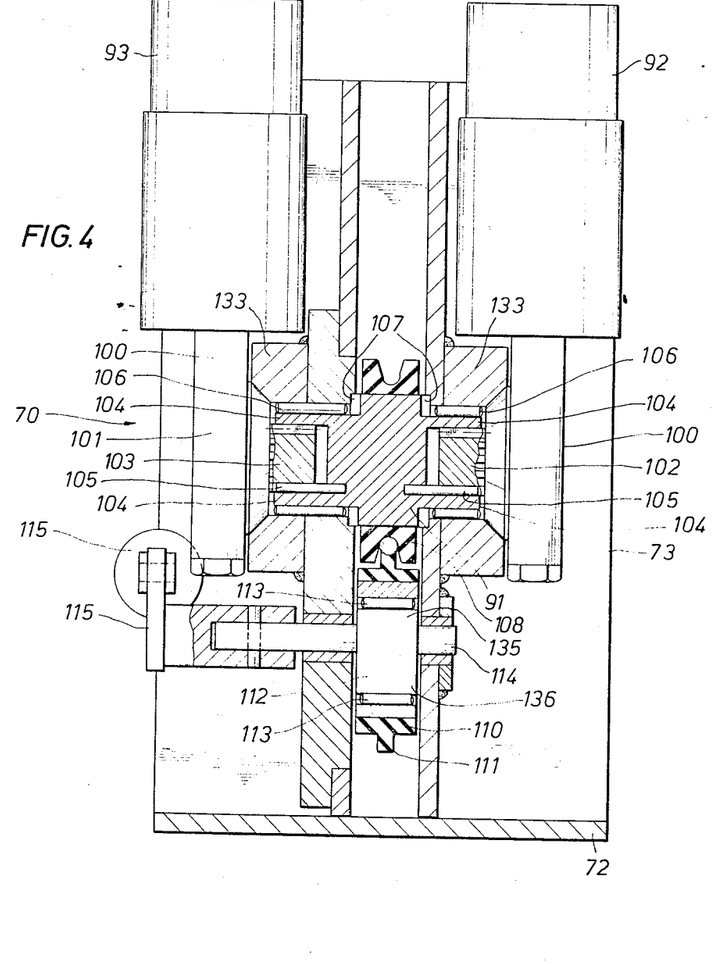
FIG. 4 is a sectional view of the radiographic unit taken along line 4—4 of FIG. 2.

In the preferred embodiment of this invention a radiographic unit 70 is attached to the pipeline crawler making it a portable X-ray pipe inspector that includes a radioactive source 76 for pentrating the pipe walls in the vicinity of a weld. Referring to FIGS. 1, 2, and 4, a shielded container 71 for storing radioactive source 76 in a protected position is mounted on a base 72 that includes a plate 73 bolted to front bulkhead 11 of the frame in slots 130 and 131. A collimator 74 for controlling the direction and emission of the radiation from radioactive source 76 when in an exposed position is mounted adjacent shielded container 71. The collimator is attached to shielded container 71 by mounting bracket 75. Wing nut assembly 78 secures colimator 74 to mounted bracket 75. Mounting bracket 75 is rigged at 77 to provide further support strength. Slots 130 and 131 provide means for adjusting the position of collimator 74 with respect to frame bulkhead 11 so that the collimator can be located substantially in the centerline of pipelines of varying diameter. Mounting bracket 75 is fastened securely to shielded container 71 by bracket extending plate 79 that fits into a slot formed in the bottom of base 72 by welded L-shaped pieces 80 and 81. Shielded container 71 has a wing nut assembly 82 that is also fastened to bracket 75 in order to further secure the mounting bracket.

Shielded container 71 includes a tubular passageway 83 in which radioactive source 76 may be contained in a protected position. In the preferred embodiment of FIG. 2 the tubular passageway may be heavy steel tubing. Surrounding tubular passageway 83 within container 71 is a shielding material, such as lead, that will serve as a shield to prevent the dangerous radiation from radioactive source 76 from escaping from the container when the radioactive source is in the protected position. In the preferred embodiment radioactive source 76 is radium 192; however, this source may be a source of gamma radiation or X-rays such as cobalt 60 or any other radioactive or X-ray material.

Housed within bracket 75 are means interconnecting the interior of container 71 and the interior of collimator 74 whereby radioactive source 76 may be moved from the container to the collimator. In the preferred embodiment this interconnecting means is coupling 88 that is aligned with and fastened onto tubular passageway 83 in container 71 and bore 84 in collimator 74.

Means are provided for extending radioactive source 76 from a protected position in shielded container 71 to an exposed position in collimator 74 and for holding the source in the exposed position shown in FIG. 2. The source extending means includes a first cable 90 moving within tubular passageway 83 and connected to radioactive source 76 so that the source can be moved through the passageway by movement of the first cable. The source extending means also includes a rotatable pulley 91 that is powered by motors 92 and 93. In the preferred embodiemnt it was found convenient to adapt and use two standard automobile power-window motors which were particularly suitable for use in the present invention because of this compact size. A second cable 94 is connected to first cable 90 by hooks 95. Second cable 94 is disposed upon pulley 91 in such a manner that clockwise rotation of power-driven pulley 91 moves second cable 94, first cable 90 and radioactive source 76 from shielded container 71 to collimator 74. Second cable 94 is disposed about pulleys 96 and 97 as well as power driven cable 91 and connected to spring 98 so that it will be under constant tension in order that the cable will be displaced by rotation of pulley 91.

Motors 92 and 93 include right angle drive units 100 and 101 having spur gears 102 and 103 for actually transmitting power. Pulley 91 has no gear which can mesh with spur gears 102 and 103; therefore, it is necessary that sprockets 104 and pins 105 be fitted between the spur gear's teeth so that pulley 91 can be rotated by motors 92 and 93. Needle bearings 106 and thrust bearings 107 provide smooth rotation of pulley 91 within housing 133. Second cable 94 is disposed within rim 108 of pulley 91 and is maintained tight against the rim by spring 98 during normal operations. As discussed later, the force of the spring will retract second cable 94 if no other device is used to hold the cable against pulley 91.

Holding means are provided for locking second cable 94 against pulley 91 after second cable 94 has been displaced causing source 76 to be in an exposed position within collimator 74. The holding means preferably includes clutch means for frictionally contacting second cable 94 and an eccentric means for forcing the clutch means against second cable 94 and pulley 91 to prevent movement. The clutch means provided for frictionally engaging second cable 94 within rim 108 of pulley 91 includes a polyurethane idler wheel 110 that is annular in shape. Idler wheel 110 has a protrusion 111 designed to press second cable 94 into rim 108 of pulley 91. Idler wheel 110 is mounted around eccentric 112 in a rotatable fashion by needle bearings 113 so that the idler wheel is free to rotate about eccentric 112. Eccentric 112 is movable between two positons. In the first position of eccentric 112, short radius peripheral surface 135 of the eccentric is disposed between shaft 114 and second cable 94 so that idler wheel 110 is in rotatable engagement with second cable 94 within rim 108 of power-driven pulley 91 such that rotation of pulley 91 causes displacement of second cable 94. In the second position long radius peripheral edge 136 of eccentric 112 is positioned between shaft 114 and cable 94 thereby displacing idler wheel 110 even closer to pulley 91 forcing second cable 94 into such a pressured fit against idler wheel protrusion 111 and pulley rim 108 that second cable 94 is frictionally locked against movement not withstanding the forces of retraction exerted by spring 98.

Eccentric 112 is rotated from its first position to its second locking position by single-acting gas cylinder 115 that is pivotally attached to eccentric 114 by follower arm 115. Gas cylinder 115 is pivotally mounted to base 72 by bracket 116. Solenoid 137 is activated by encoder circuit 44 to allow piston 138 of gas cylinder 115 to be extended thereby moving eccentric 112 from its first to its second position.

Means are provided for automatically retracting radioactive source 76 from the exposed position in collimator 74 to the protective position and shielded container 71 upon release of the holding means; that is, movement of eccentric 112 from its second to its first position. The automatic retracting means includes means connected to second cable 94 and exerting a force thereon that urges radioactive source 76 from the exposed position to the protected position. The force exerting means is spring 98 that is connected between rear bulk head 12 of frame 10 and second cable 94, the force of the spring causing radioactive source 76 to retract from said extended position in collimator 74 upon disengagement of the clutch means. Spring 98 is a simple but reliable way to insure that the radioactive source will not remain in an exposed position in collimator 74 if the clutch means should fail. In the preferred embodiment illustrated, solenoid 137 operating gas cylinder 115 is operated to supply pressure to cylinder 115 only when a specific frequency electrical signal is present from the receiver-encoder 40, and in absence of this signal solenoid 137 will shut off the supply of gas to cylinder 137. Thus, in absence of the specific control signal the radioactive source will not be exposed, or in the event of loss of the control signal, such as by a power failure, then the source will be automatically retracted to its protected position. In this way inadvertant exposure to dangerous radiation is prevented, and, for example, should the machine break down in the pipeline, the radioactive source will be automatically retracted when the signal from the transmitter-encoder is removed.

When the X-ray pipe weld inspector is first placed into the pipeline to be inspected radioactive source 76 is in the protected position within shielded container 71. When the source is in this protected position, the other end of first cable 90 is exposed just outside of safety lock 120. In order to prepare the source extending means for operation, first cable 90 is hooked to second cable 94 that has one end exposed near safety clamp 120. Safety clamp or lock 120 is provided to insure that radioactive source 76 remains in shielded container 71 when the unit is not in operation. Key 121 of safety clamp 120 is then turned to unclamp first cable 90 and to attach radioactive source 76 so that the source may be positioned by the movement of second cable 94. At this time wheel 50 is distended into contact with the upper pipe wall by actuating gas cylinder 54 through the opening of valve 59.

After the X-ray pipe inspector unit has been moved down the pipeline by the operator actuated motors 30, the pipe inspector is stopped with collimator 76 aligned with the weld to be inspected. As previously described, the X-ray pipe inspector is started and stepped by an operator generating particular frequencies on an encoder-transmitter (not shown) which are received and converted into electrical signals of the same frequencies by receiving transducer 40 to trigger control signals in encoder circuits 44. These controls signals operate one of the solenoids 35 that switch power in and out to motors 30.

When the X-ray inspector is properly aligned with the weld to be inspected the operator generates a source extend signal from the encoder-transmitter and encoder circuits 44 generate a signal to one of solenoids 35 connected between batteries 38 and pulley motors 92 and 93 so that when this solenoid is operated, pulley 91 is rotated clockwise. At this time eccentric 112 has its short radius peripheral surface 135 opposite pulley 91 so that rotatable idler wheel 110 rotates as pulley 91 rotates in order that second cable 94, first cable 90 and radioactive source 76 are moved toward bore 76 in collimator 74. A limit switch 122 is positioned a predetermined distance from stop 123, the distance being equal to the distance radioactive source 76 must travel in order to be positioned within collimator 74. Thus when second cable 94 has traveled sufficient distance to place the radioactive source in the collimator, stop 127 contacts limit switch 123 and power to pulley motors 92 and 93 is cut off.

At this point the operator utilizes the encoder-transmitter to generate an output signal from encoder circuit 44 in order for one of solenoids 35 to activate gas cylinder 115 thereby rotating eccentric 112 into its second position opposite pulley 91. In this second position long radius periphery 136 of eccentric 112 displaces clutch wheel 110 into contact against second cable 94 thus locking the second cable against the force of retraction of spring 98. Thus radioactive source 76 is locked into a position of alignment with the pipe weld to be examined so that the irradiation of the source penetrates the pipe wall and records upon a film placed over the weld outside the wall any defects in the weld.

After sufficient exposure time of the radioactive source another signal is generated on the encoder-transmitter by the operator or by a preset delay so that encoder circuits 44 generate a signal to a solenoid 137 to cause gas cylinder valve 115 (not shown) to exahust to atmosphere so that the piston 138 returned to its initial position. The single acting cylinder piston rod is returned to the first position of eccentric 112 by the force of a spring (not shown) with the cylinder. If for any reason the operator should be unable to return cylinder 115 to the first position of eccentric 112 the encoder circuit is designed so that following a predetermined delay period the signal operating solenoid 137 is cut off to move the eccentric out of its position locking second cable 94, first cable 90 and source 76 in the exposed position. After the radioactive source is safely retracted into shielded container 71, the X-ra pipe inspector maybe moved on to the next weld to be inspected.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A unitary, low profile pipeline crawler device having a center of gravity sufficiently close to the bottom of a pipeline such that substantially the whole device stays substantially upright during movement along an inside pipe wall and such that substantially the whole device moves without appreciable deviation along a path substantially parallel to the longitudinal axis of the pipeline, comprising in combination: a frame having a low profile in said pipeline and including a plurality of wheel supports; a wheel mounted on each of said wheel supports, said wheels and wheel supports supporting said crawler for movement along the bottom of said pipeline; a battery mounted in the lower region of said frame such that substantially all of said battery is located below the centerline of said pipeline when the crawler device is therein for powering said device, the distance between said wheels transversely to said pipeline, the low profile of said frame and the location of the mounting of said battery being such to provide righting moments of inertia that exceed the normal forces tending to overturn said device as it moves in said pipeline to prevent said device from deviating substantially from said path, and to cause the device to inherently right itself; and at least one driving motor mounted on said frame, and connected to said battery, and drivingly connected to a wheel, the effective center of gravity of the whole of said device being fixed with respect to the device when the device deviates from said path and the relationship of said effective center of gravity and the mounting of said wheels providing the effective forces for righting said device.

2. The crawler device of claim 1 including: an adjustable wheel mounted onto said frame, means distending said adjustable wheel into contact with said inside pipe wall so that said wheels and said adjustable wheel maintain traction against said wall when said driving motors are moving said crawler along said inside pipe wall.

3. The crawler device of claim 1 in which said wheel supports include flanges extending from said frame, and further include means for rotatably mounting said wheels on either side of said flanges.

4. The pipe crawler device of claim 1 further including means for displacing said wheels from contact with said inside pipe wall, and a plurality of rolling means connected to said displacing means and partially supporting the weight of said crawler device when said wheels are displaced in order to provide mobility to said device when said wheels are displaced.

5. The pipe crawler device of claim 4 wherein said displacing means includes: a longitudinally threaded member rotatably mounted on said frame; a sleeve threadably engaging said longitudinal member such that said sleeve is longitudinally displaced by rotation of said threaded member; a shaft rotatably mounted on said frame; a slotted crank slidably connected at one end to said sleeve, and rigidly connected at its other end to said shaft; a link arm having said rolling means mounted on one end and rigidly connected to said shaft so that said rolling means is moved into contact with said pipe wall by longitudinal displacement of said sleeve.

6. The crawler device of claim 1 wherein said device is a portable X-ray pipe inspector including a radioactive source for penetrating said inside pipe walls, said inspector including: a shielded container mounted on said frame for storing said radioactive source in a protected position; a collimator mounted adjacent to said container for controlling the direction and emission of said radioactive source in an exposed position; means interconnecting the interior of said container and the interior of said collimator whereby said radioactive source may be moved to said collimator from said container; means for extending said radioactive source from said protected position within said shielded container to said exposed position within said collimator;

means for holding said source in said exposed position; and means automatically retracting said radioactive source from said exposed position in said collimator to said protected position in said shielded container upon release of said holding means.

7. The portable X-ray pipe inspector of claim 6 including: an adjustable wheel mounted onto said frame, means distending said adjustable wheel into contact with said inside pipe wall so that said wheels and said adjustable wheel maintain traction against said wall when said driving motors are moving said crawler along said pipeline, means for displacing said wheels from contact with said inside pipe wall, and a plurality of rolling means connected to said displacing means and partially supporting the weight of said crawler device when said wheels are displaced in order to provide mobility to said inspector when said wheels are displaced.

8. The portable pipe weld inspector of claim 6 in which said shielded container includes a tubular passageway in which said radioactive source is contained in said protected position; and said source extending means includes a first cable moving within said passageway, said first cable connected to said radioactive source so that said source can be moved through said passageway by movement of said first cable.

9. The pipe weld inspector of claim 8 in which said source extending means includes: a power-driven rotatable pulley; a second cable connected to said first cable and being disposed upon said pulley such that rotation of said pulley in one direction moves said second cable, first cable and said radioactive source from said container to said collimator; said holding means locking said second cable against said pulley after said second cable has been moved to said extended position; and said automatic retracting means including means connected to said second cable and exerting a force thereon which urges said source from said exposed position to said protected position.

10. The pipe weld inspector of claim 9 wherein said holding means includes: clutch means for frictionally engaging said second cable to force it against said pulley to lock said second cable against movement; and eccentric means for so forcing said clutch means against said second cable and said pulley; said eccentric means movable from a first position for causing engagement of said clutch means to a second position wherein said clutch means locks said second cable against movement.

11. The pipe weld inspector of claim 10 in which said force exerting means is a spring connected between the frame and, said second cable, the force of said spring causing said radioactive source to retract from said exposed position in said collimator to said protected position in said shielded container upon said clutch being disengagd.

12. The portable X-ray pipe inspector of claim 6 including means for adjusting the vertical position of said collimator with respect to said frame so that said collimator may be located substantially on the centerline of pipeline of varying diameter.

13. As a subcombination, an X-ray exposing and shielding device adapted to be mounted on an X-ray inspection machine, said device comprising: a frame; a shielded contaier mounted on said frame and including a tubular passageway in which a radioactive source is maintained in a protected position; a collimator mounted on said frame adjacent to said container for controlling the direction and emission of said radioactive source in an exposed position; means interconnecting the interior of said container and the interior of said collimator whereby said radioactive source may be moved to said collimator from said container; means for extending said radioactive source from said protected position within said shielded container to said exposed position within said collimator; said source extending means including a cable moving within said passageway, said cable connected to said radioactive source so that said source can be moved through said passageway by movement of said cable, a power driven rotatable pulley, said cable being disposed upon said pulley such that rotation of said pulley in one direction moves said cable and said radioactive source from said container toward said collimator; means for holding said source in said exposed position, said holding means locking said cable against said pulley after said cable has been moved to said extended position, and including clutch means for frictionally engaging said cable to force it against said pulley to lock said cable against movement, and eccentric means for so forcing said clutch means against said cable and said pulley, said eccentric means movable from a first position for causing engagement of said clutch means to a second position wherein said clutch means locks said cable against movement; and means for causing said radioactive source to automatically retract from said exposed position in said collimator to said protected position in said shielded container upon release of said holding means.

14. The X-ray exposing and shielding device in claim 20 further including a spring connected between the frame and said cable, the force of said spring causing said radioactive source to retract from said extended position in said collimator upon said clutch being disengaged.

15. The device of claim 1 including two driving motors mounted on said frame each drivingly connected to a different wheel, and means for drivingly connecting the wheels driven by said motors.

* * * * *

UNITED STATES PATENT OFFICE
CERTIFICATE OF CORRECTION

Patent No. 3,775,612    Dated November 27, 1973

Inventor(s) ROBERT D. FOSTER, ET AL

It is certified that error appears in the above-identified patent and that said Letters Patent are hereby corrected as shown below:

```
Column 2,  line 32,  "pipeling" should be -- pipeline --
Column 3,  line 62,  "cralwer" should be -- crawler --
Column 3,  line 68,  "as as" should be -- as --
Column 5,  line 48,  "63" should be -- 64 --
Column 6,  line 24,  "colimator" should be -- collimator--
Column 6,  line 68,  "embodiemnt" should be --embodiment--
Column 8,  line 53,  "stepped" should be -- stopped --
Column 9,  line 29,  "exahust" should be --exhaust --
Column 9,  line 41,  "X-ra" should be -- X-ray --
Column 9,  line 42,  "maybe" should be -- may be --
Column 12, line 9,   "contaier" should be -- container--
Column 12, line 46,  "Claim 20" should be -- Claim 13 --
```

Signed and sealed this 6th day of August 1974.

(SEAL)
Attest:

McCOY M. GIBSON, JR.          C. MARSHALL DANN
Attesting Officer             Commissioner of Patents